(12) United States Patent
Yamaguchi et al.

(10) Patent No.: US 10,273,926 B2
(45) Date of Patent: Apr. 30, 2019

(54) CONTROLLING ENGINE OUTPUT AT THE START OF VEHICLE MOVEMENT

(71) Applicant: SUZUKI MOTOR CORPORATION, Shizuoka-Ken (JP)

(72) Inventors: Junpei Yamaguchi, Shizuoka-Ken (JP); Hiroki Kitajima, Shizuoka-Ken (JP)

(73) Assignee: SUZUKI MOTOR CORPORATION (JP)

( * ) Notice: Subject to any disclaimer, the term of this patent is extended or adjusted under 35 U.S.C. 154(b) by 152 days.

(21) Appl. No.: 14/878,510

(22) Filed: Oct. 8, 2015

(65) Prior Publication Data

US 2016/0102646 A1 Apr. 14, 2016

(30) Foreign Application Priority Data

Oct. 8, 2014 (JP) .................... 2014-207445

(51) Int. Cl.
*F16H 61/02* (2006.01)
*F02P 5/04* (2006.01)
(Continued)

(52) U.S. Cl.
CPC .............. *F02P 5/045* (2013.01); *F02D 37/02* (2013.01); *F02D 41/0225* (2013.01); *F02D 41/061* (2013.01); *F02D 41/10* (2013.01); *F02P 5/1506* (2013.01); *F02D 2041/228* (2013.01); *F02D 2200/0404* (2013.01);
(Continued)

(58) Field of Classification Search
CPC ................. B60W 10/06; B60W 10/08; B60W 2710/0644; B60W 2710/0666; B60W 2710/0667; F02D 41/062; F02D 41/0225; F02D 41/061; F02D 41/10; F02D 37/02; Y02T 10/46; Y02T 10/6286; Y10S 903/918; F02P 5/045; F02P 5/1506; B60K 28/16
USPC ..... 701/113, 110, 82, 84, 86, 93; 123/179.3, 123/179.4
See application file for complete search history.

(56) References Cited

U.S. PATENT DOCUMENTS 5,829,544 A * 11/1998 Ishizu .................. B60K 28/165
180/197
6,291,902 B1 * 9/2001 Ogane .................... B60K 6/485
123/179.1
(Continued)

FOREIGN PATENT DOCUMENTS

JP 11173177 A 6/1999
JP 2001323864 A 11/2001
(Continued)

OTHER PUBLICATIONS

Japanese Office Action for corresponding application 2014-207445, dated May 22, 2018.

*Primary Examiner* — Hai H Huynh
*Assistant Examiner* — Gonzalo Laguarda
(74) *Attorney, Agent, or Firm* — Barnes & Thornburg LLP

(57) ABSTRACT

There are provided a start determinator for determining whether or not the vehicle has started, an elapsed timer for measuring elapsed time since start of the vehicle determined by the start determinator; and a start controller for adjusting an engine output by changing the output in multiple stages until the elapsed time measured by the elapsed timer reaches a control time determined in advance if the start of the vehicle is determined by the start determinator.

15 Claims, 14 Drawing Sheets

(51) Int. Cl.
    *F02D 41/02*     (2006.01)
    *F02D 41/10*     (2006.01)
    *F02P 5/15*     (2006.01)
    *F02D 37/02*     (2006.01)
    *F02D 41/06*     (2006.01)
    *F02D 41/22*     (2006.01)

(52) U.S. Cl.
    CPC ......... *F02D 2200/101* (2013.01); *F02D 2200/1012* (2013.01); *F02D 2250/22* (2013.01); *Y02T 10/46* (2013.01)

(56) References Cited

U.S. PATENT DOCUMENTS

| | | | |
|---|---|---|---|
| 6,342,027 B1* | 1/2002 | Suzuki | B60K 6/48 |
| | | | 477/5 |
| 8,180,550 B2* | 5/2012 | Oshima | B60K 28/16 |
| | | | 701/90 |
| 2006/0095197 A1* | 5/2006 | Nishi | F02N 11/10 |
| | | | 701/113 |
| 2016/0153379 A1* | 6/2016 | Takaoka | F02D 41/062 |
| | | | 701/113 |

FOREIGN PATENT DOCUMENTS

| | | |
|---|---|---|
| JP | 2010031844 A | 2/2010 |
| JP | 2010216297 A | 9/2010 |
| JP | 2011033006 A | 2/2011 |
| JP | 2012202285 A | 10/2012 |

\* cited by examiner

| MODE | FIRST CONTROL TIME (0.5 SECONDS) | SECOND CONTROL TIME (0.5 SECONDS) | THIRD CONTROL TIME (3 SECONDS) |
|---|---|---|---|
| A MODE | FOURTH STAGE | SECOND STAGE | FIFTH STAGE |
| B MODE | SECOND STAGE | FIRST STAGE | FIFTH STAGE |

FIG. 3

| MODE | FIRST CONTROL TIME (0.5 SECONDS) | SECOND CONTROL TIME (0.5 SECONDS) | THIRD CONTROL TIME (3 SECONDS) |
|---|---|---|---|
| C MODE | FIRST STAGE | SECOND STAGE | FOURTH STAGE |

FIG. 4

| MODE | FIRST CONTROL TIME (0.5 SECONDS) | SECOND CONTROL TIME (1.5 SECONDS) | THIRD CONTROL TIME (1.5 SECONDS) |
|---|---|---|---|
| D MODE | THIRD STAGE | FIRST STAGE | SECOND STAGE |

FIG. 5

CONTROLLING ENGINE OUTPUT AT THE START OF VEHICLE MOVEMENT

CROSS-REFERENCE TO RELATED APPLICATION

This application is based upon and claims the benefit of priority from Japanese Patent Application No. 2014-207445, filed Oct. 8, 2014; the entire contents of which are incorporated herein by reference.

BACKGROUND OF THE INVENTION

Field of the Invention

The present invention relates to an engine controller.

Description of the Related Art

An engine controller is known in which, if two conditions, that is, a throttle opening degree of an engine and a gear position of a transmission connected to the engine are in a start running state determined in advance, and if a start switch is operated to be switched on, ignition timing of the engine is delayed and gripping performances of a tire at start of a vehicle is improved (see Patent Document 1 (Japanese Patent Laid-Open No. 2001-323864)).

A prior-art engine controller has a start detector which detects a start running state of a vehicle and delays the ignition timing of the engine when the start running state is detected by the start detector. The prior-art start detector detects that the state enters the start running state when the throttle opening degree is 1/2 or less and the gear position is at a third gear or less. If the prior-art start detector detects the start running state, it causes the ignition timing to be delayed by an ignition timing controller. However, the prior-art start running detector does not detect the start running state any longer if a state in which the throttle opening degree exceeds 1/2 or the gear position exceeds the third gear starts after the control for delaying the ignition timing is started. Then, the ignition timing controller cancels a mode for delaying the ignition timing and returns the ignition timing of the engine to a normal state.

Thus, in the prior-art engine controller, in order to continue the mode for delaying the ignition timing with the purpose of improvement of the gripping performances of the tire at start of the vehicle, a rider needs to continue an operation of keeping the throttle opening degree to 1/2 or less.

Therefore, such a rider who opens the throttle large at the start in order to achieve a fast start dash cannot utilize delay control of the ignition timing in the prior-art engine controller. That is, the prior-art engine controller not only forces mental strain to the rider who seeks the gripping performances of the tire at the start but also the delay control cannot be used and acceleration performances of the vehicle itself cannot be fully brought out.

SUMMARY OF THE INVENTION

Thus, in view of the circumstances described above, an object of the present invention is to provide an engine controller which can easily bring out the acceleration performances of the vehicle itself without giving mental strain even to a rider who opens the throttle large at the start.

In order to solve the aforementioned problems, the engine controller according to the present invention includes a start determinator for determining whether or not the vehicle has started, an elapsed timer for measuring elapsed time since start of the vehicle determined by the start determinator, and a start controller for adjusting an engine output by changing it in multiple stages until the elapsed time measured by the elapsed timer reaches a control time determined in advance if the start of the vehicle is determined by the start determinator.

In preferred embodiments of the above aspect, the following modes may be provided.

It may be desired that the change in the multiple stages of the engine output includes at least a change to an output lower than a standard output.

It may be further desired that a start control request switch connected to the start controller and receiving an operation input on whether or not to execute control for adjustment by changing an output of the engine in multiple stages.

It may be desired that the change of the engine output in multiple stages includes a plurality of adjustment types differing in at least either one of size of outputs of the engine and duration in each stage with the different engine outputs.

It may be desired that the start determinator starts the determination if conditions that the start control request switch has been operated, a gear position of the transmission connected to the engine is at a stage lower than a position determined in advance, and a rotation speed of the engine is within a rotation speed range determined in advance are all satisfied.

It may be desired that the start determinator determines that the vehicle has started if a drop rate of the rotation speed of the engine is larger than a drop rate determined in advance.

It may be desired that the start determinator suppresses start determination of the vehicle if the rotation speed of the engine is at an upper limit rotation speed determined in advance or more.

It may be desired that if a throttle opening degree of the engine is smaller than a throttle lower limit opening degree determined in advance in accordance with a rotation speed of the engine, the start determinator suppresses start determination of the vehicle.

It may be desired that if a gear position of the transmission connected to the engine changes to the position determined in advance or more, the start controller finishes control for adjusting an output of the engine even before elapsed time measured by the elapsed timer reaches the control time.

It may be desired that if a state in which a throttle opening degree of the engine becomes substantially fully closed reaches fully closed duration determined in advance, the start controller finishes control for adjusting an output of the engine even before elapsed time measured by the elapsed timer reaches the control time.

It may be desired that the start controller notifies a state of engine output adjustment control for adjusting an output of the engine and a status of an engine rotation speed which satisfies an execution condition of the engine output adjustment control by lighting-on or a flashing pattern of an indicator lamp.

According to the present invention, regarding a control operation of a driving torque to a driving wheel at the start, the engine controller which can easily bring out the acceleration performances of the vehicle itself at the start of the vehicle can be provided without giving mental strain to the rider.

The characteristics, operations and advantages of the present invention described above will be more apparently understood by the following description made to the preferred embodiment with reference to the accompanying drawings.

BRIEF DESCRIPTION OF THE DRAWINGS

FIG. 3 is a view illustrating an example of a mode in engine output adjustment control of the engine controller according to the embodiment of the present invention;

FIG. 4 is a view illustrating another example of a mode in the engine output adjustment control of the engine controller according to the embodiment of the present invention;

FIG. 5 is a view illustrating another example of a mode in the engine output adjustment control of the engine controller according to the embodiment of the present invention;

DETAILED DESCRIPTION OF THE PREFERRED EMBODIMENT

An embodiment of an engine controller according to the present invention will be described below by referring to FIGS. 1 to 15.

Figure 1:
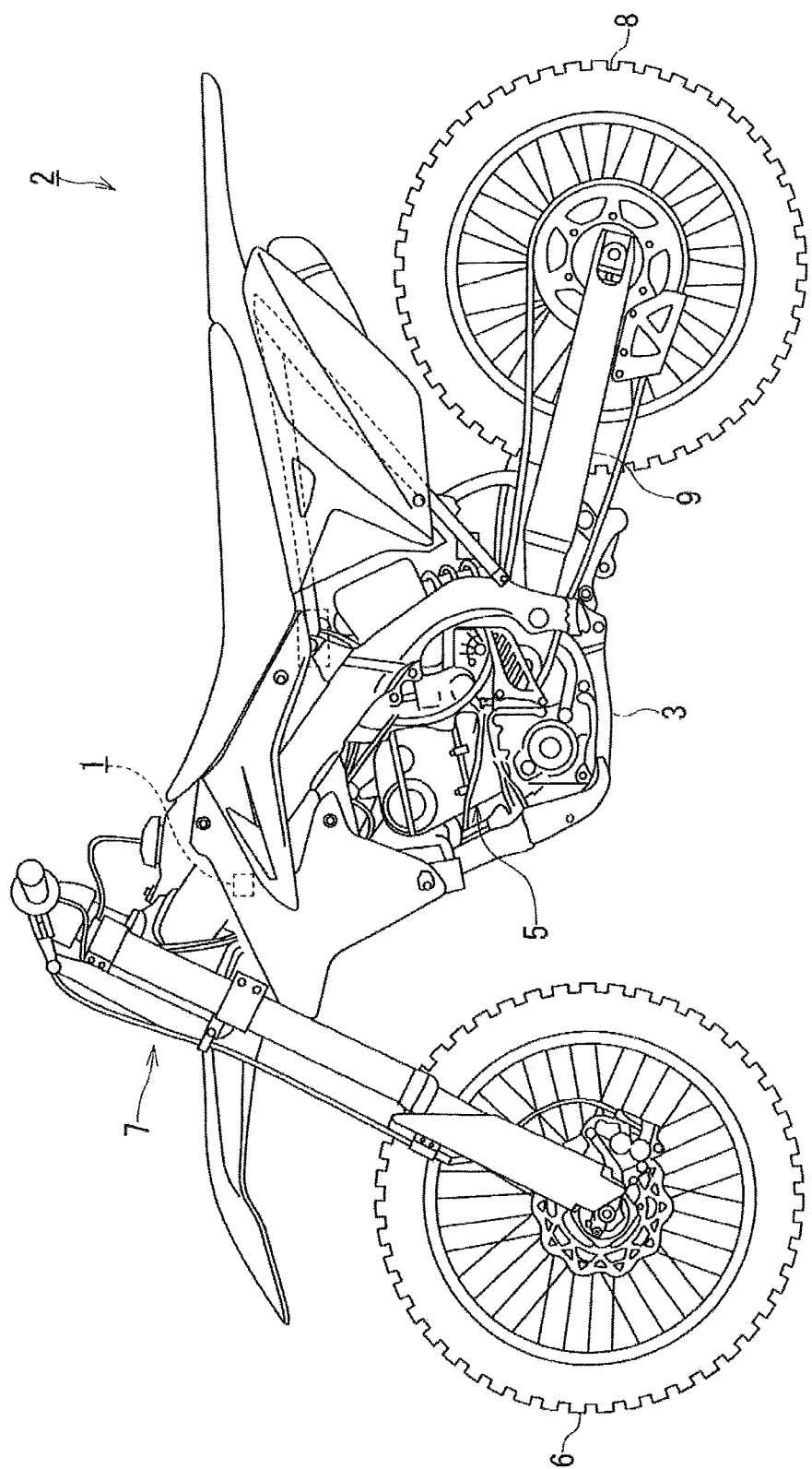
FIG. 1 is a side view illustrating a vehicle to which an engine controller according to an embodiment of the present invention is applied.

FIG. 1 is a side view illustrating a vehicle to which the engine controller according to the embodiment of the present invention is applied.

As illustrated in FIG. 1, a vehicle 2 to which an engine controller 1 according to this embodiment is applied is a so-called motorcycle. The vehicle 2 includes a vehicle body 3 extending in a longitudinal direction, an engine 5 mounted on the vehicle body 3, a front wheel 6 as a steering wheel arranged on a front of the vehicle body 3, a steering mechanism 7 supporting the front wheel 6 on the vehicle body 3 capable of steering, a rear wheel 8 as a driving wheel arranged on a rear of the vehicle body 3, and a swing arm 9 supporting the rear wheel 8 on the vehicle body 3 capable of swing in a vertical direction.

The vehicle 2 is an off-road type motorcycle but this is not limiting and it may be other types of motor cycles such as an on-road type or a scooter type motorcycle.

The engine controller 1 adjusts an output of the engine 5 until a control time Tr determined in advance is reached if it detects start of the vehicle 2. The engine controller 1 will be described later in detail.

Figure 2:
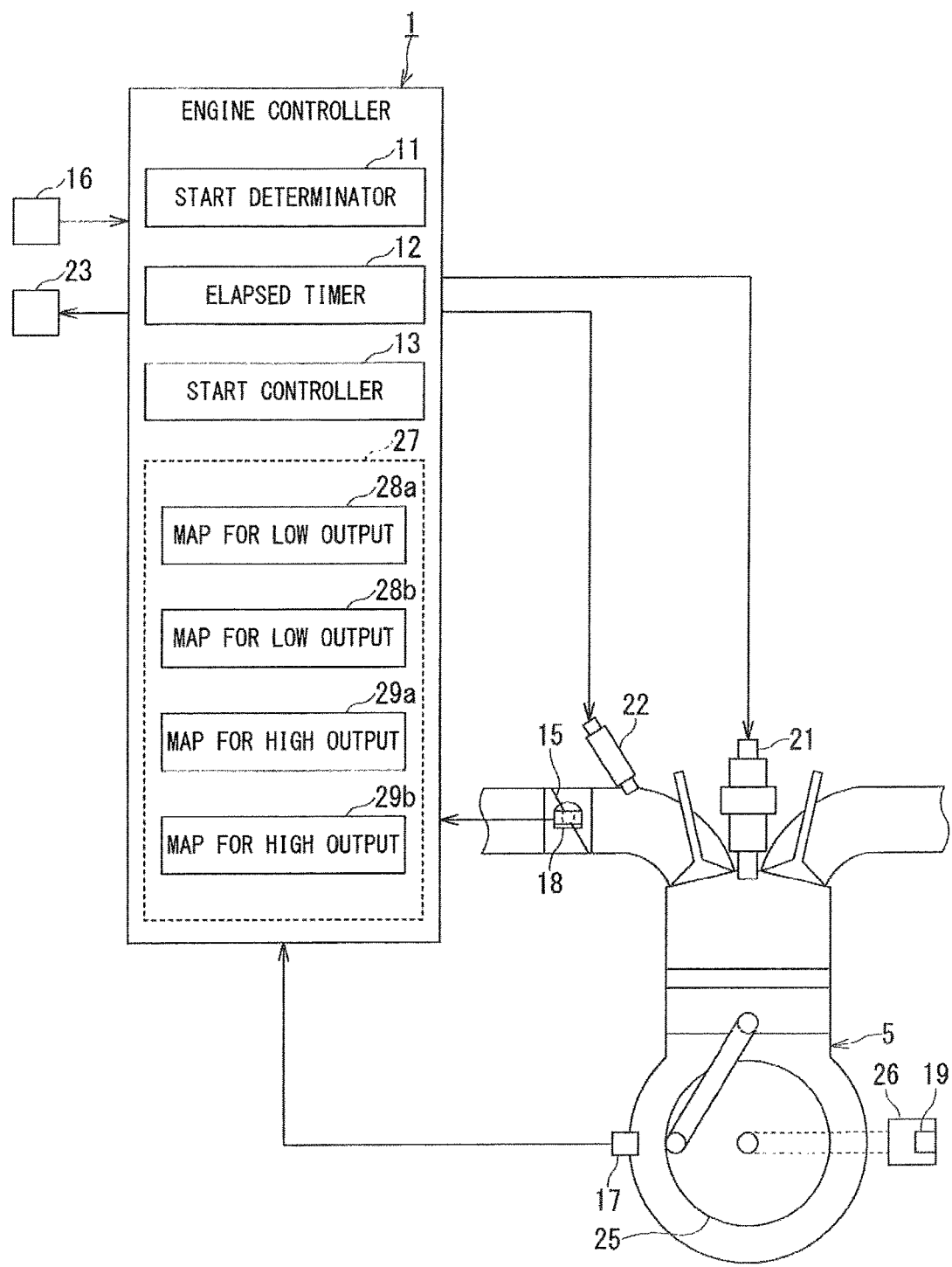
FIG. 2 is a block diagram illustrating the engine controller according to the embodiment of the present invention.

FIG. 2 is a block diagram illustrating the engine controller according to the embodiment of the present invention.

As illustrated in FIG. 2, the engine controller 1 according to this embodiment includes a start determinator 11 for determining whether or not the vehicle 2 has started, an elapsed timer 12 for measuring elapsed time Tp after the start of the vehicle 2 is determined by the start determinator 11, and a start controller 13 for adjusting an output of the engine 5 by changing it in multiple stages until the elapsed time Tp measured by the elapsed timer 12 reaches a control time Tr determined in advance when start of the vehicle 2 is determined by the start determinator 11.

Moreover, the engine controller 1 includes a microprocessor (not shown) and a storage device (not shown) storing various calculation programs executed by the microprocessor, parameters and the like. The start determinator 11, the elapsed timer 12, and the start controller 13 are programs stored in the storage device in advance and they are read out of the storage device and executed by the microprocessor.

Control by the start controller 13 for adjusting the output of the engine 5 shall be referred below to simply as "engine output adjustment control". The engine output adjustment control adjusts the output of the engine 5 by combining thinning misfire of ignition or delay of ignition timing, advance of the ignition timing, a decrease or increase of a fuel injection amount, adjustment of an opening degree of a throttle valve 15 by an electronically controlled throttle or the like in addition to the ignition timing of the engine 5.

The engine output adjustment control includes changes of temporarily lowering, temporary increase, and temporary return of the engine output to a standard (reference) in multiple stages on the basis of a standard engine output with respect to an operation amount of a right grip (throttle grip) from start of the vehicle 2 to the control time Tr. The engine output adjustment control has at least one of adjustment types sequentially combining an increase/decrease amount of the engine output and its duration (at least shorter than the control time Tr). Each of the adjustment types sequentially combining the increase/decrease amount of the engine output and the control time is referred to as a mode. That is, the engine output adjustment control has at least one mode besides the standard mode which is a reference. In other words, the changes in the multiple stages of the engine output include a plurality of modes differing in at least either one of the size of engine outputs and the duration in each of stages with different engine outputs.

The engine controller 1 receives a signal from a start control request switch 16, a crank pulse generator 17, a throttle sensor 18, and a gear position sensor 19 and transmits the signal to an igniter 21, an injector 22, and an indicator lamp 23.

First, the start control request switch 16 is an input device for selecting whether or not to execute the engine output adjustment control at start of the vehicle 2 and is also an input device for selecting what engine output adjustment control is to be executed, that is, in what mode the engine output adjustment control is to be executed. The engine controller 1 receives an input when the start control request switch 16 is pressed long and executes the engine output adjustment control at start of the vehicle 2 in order to prevent an input by a misoperation of the start control request switch 16, for example. The start control request switch 16 is provided close to either one of right and left grips. An installation space cannot be ensured easily around the right grip since there are a throttle cable and the like, but in the case of the left grip, there is a space of the start control request switch 16, which is advantageous. In the embodiment of the present invention, the start control request switch 16 is assumed to be mounted on a handle bar close to the left grip.

The crank pulse generator 17 is provided in the engine 5 and measures a rotation speed Ne of a crank shaft 25 and outputs it to the engine controller 1.

The throttle sensor 18 senses an opening degree $\theta$ of the throttle valve 15 provided in an intake system of the engine 5 (hereinafter referred to simply as the "throttle opening degree $\theta$") and outputs it to the engine controller 1.

The gear position sensor 19 senses a gear position (shift position) GP of a transmission 26 connected to the engine 5 or in the case of a 5-speeds transmission 26, for example, it detects which position from a first gear to a fifth gear is selected in a state in which a driving force from the engine 5 is transmittable to the driving wheel or whether the position is at a neutral position (neutral) or not.

The igniter 21 ignites and fires an air mixture compressed by the engine 5. The engine controller 1 controls ignition timing of the engine 5 by controlling the igniter 21. The injector 22 injects a fuel to an intake of the engine 5. The engine controller 1 controls concentration of the air mixture by adjusting a fuel injection amount through control of the injector 22. The engine controller 1 executes the engine output adjustment control through control of the ignition timing of the engine 5, control of concentration of the air mixture, and control of duration and switching timing of those controls.

The indicator lamp 23 is a light source such as an LED or a light bulb. The engine controller 1 notifies various types of information relating to the vehicle 2 and the engine controller 1 of at least one person of a rider and an assistant by turn on or flashing the indicator lamp 23. The indicator lamp 23 may notify the various types of information relating to the vehicle 2 and the engine controller 1 by changing an emitted color in addition to turning-on, flashing and turning-off. In the embodiment of the present invention, the indicator lamp 23 is preferably arranged on an operation panel on which the start control request switch 16 is mounted. In detail, it is preferable that the indicator lamp 23 is arranged on a right side of the start control request switch 16 arranged close to the left grip and is not hidden by an operation of the start control request switch 16 by a left hand.

Moreover, the engine controller 1 has a plurality of ignition timing correction maps 27 determined by a relation between the rotation speed Ne of the engine 5 and the throttle opening degree $\theta$ in addition to an ordinary standard ignition timing map determined by a relation between the rotation speed Ne of the engine 5 and the throttle opening degree $\theta$.

Each of the ignition timing correction maps 27 determines a correction amount by the relation between the rotation speed Ne of the engine 5 and the throttle opening degree $\theta$ from the standard ignition timing of the engine 5 in accordance with a mode selected by an operation of the start control request switch 16 by the rider or the assistant. Specifically, the engine controller 1 has maps 28a and 28b for a low output for keeping the output of the engine 5 lower than the standard ignition timing and maps 29a and 29b for a high output for increasing the output of the engine 5 higher than the standard ignition timing. In the embodiment of the present invention, an example in which a plurality of the ignition timing correction maps 27 are provided is illustrated, but it may be so configured that a plurality of air mixture concentration correction maps for increasing or decreasing a concentration of the mixture by adjusting a standard fuel injection amount used for normal control are provided, and the respective air mixture concentration correction maps are applied to a map for a low output for keeping the output of the engine 5 and a map for a high output for increasing the output of the engine 5. Moreover, the output of the engine 5 may be adjusted by correcting the ignition timing and the fuel injection amount at the same time.

The engine controller 1 switches necessity of application of the correction map and the ignition timing correction map 27 in the case of application and starts the requested engine output adjustment control on the basis of an input of the start control request switch 16 if the engine 5 is started and the transmission 26 is at a neutral position or at a gear position determined in advance (a first position, that is, a gear position for low-speed running capable of start and from a first gear to a third gear, for example) and the engine rotation speed Ne is lower than a rotation speed Nea allowing map selection determined in advance (3500 rpm, for example). The engine controller 1 switches which mode of the engine output adjustment control is to be applied or none of them is to be applied depending on a length of duration of a long-pressing operation of the start control request switch 16. An operation state or operation control of the engine 5 in which none of the modes is applied is referred to as a standard mode for convenience.

Subsequently, a specific example of the mode in the engine output adjustment control will be described.

FIG. 3 is a view illustrating an example of the mode in the engine output adjustment control of the engine controller according to the embodiment of the present invention.

As illustrated in FIG. 3, the engine output adjustment control of the engine controller 1 according to this embodiment has a plurality of modes or two modes, that is, an A mode and a B mode, for example.

The engine output adjustment control is capable of adjustment of the output of the engine 5 in multiple stages, that is, in five stages in which the larger the number of the stage is, the higher the output becomes, for example, and by using a third stage as an output adjustment stage for obtaining a standard engine output, adjusts the engine output in the multiple stages from a first stage for obtaining a minimum output to a fifth stage for obtaining a maximum output. The map 28b for a low output is applied to the first stage, the map 28a for a low output is applied to a second stage, the map 29b for a high output is applied to a fourth stage, and the map 29a for a high output is applied to the fifth stage for example.

The plurality of modes are set by combining the engine output in the multiple stages and their control time. In these modes, at least a change to an output lower than the standard output, that is, to a first stage or a second stage is included in the change of the engine output in the multiple stages.

In the A mode in the engine output adjustment control, for example, the engine output is sequentially adjusted such as an engine output of the fourth stage from the start of the vehicle 2 to a first control time $\Delta Tr1$, an engine output of a second stage from after the first control time $\Delta Tr1$ has elapsed to a second control time ΔTr2, and an engine output of a fifth stage from after the second control time ΔTr2 has elapsed to a third control time ΔTr3.

In the B mode in the engine output adjustment control, the engine output is sequentially adjusted such as the engine output of the second stage from the start of the vehicle 2 to the first control time ΔTr1, the engine output of the first stage from after the first control time ΔTr1 has elapsed to the second control time ΔTr2, and the engine output of the fifth stage from after the second control time ΔTr2 has elapsed to the third control time ΔTr3.

The A mode and the B mode are modes set with a purpose of obtaining favorable acceleration immediately after the start of the vehicle 2. For example, if the vehicle 2 is started on a road surface such as a road race with a friction coefficient higher than that on a general road, by temporarily increasing the engine output immediately after the start as in the A mode, favorable acceleration can be obtained. In the case of the start of the vehicle 2 from a start gate such as a motocross race with the friction coefficient lower than that on an ordinary road surface, by lowering the engine output immediately after the start as in the B mode, slip of the rear wheel 8 is suppressed, and favorable acceleration can be obtained. If a change of the friction coefficient on the road surface or the like can be forecast such as in the case of passage of the start gate of the motocross race or the like, the control of the engine output and the control times ΔTr1, ΔTr2, and ΔTr3 can be set as appropriate in accordance with that.

A sum of the first control time ΔTr1=0.5 seconds, the second control time ΔTr2=0.5 seconds, and the third control time ΔTr3=3.0 seconds is the control time Tr=4.0 seconds (first control time ΔTr1+second control time ΔTr2+third control time ΔTr3=control time Tr). The first control time ΔTr1, the second control time ΔTr2, and the third control time ΔTr3 are arbitrarily set within a range set with the purpose of obtaining favorable acceleration immediately after the start of the vehicle 2.

Moreover, the standard mode is equivalent to continuation of a standard engine output (third stage) during the control time Tr.

Moreover, the engine controller 1 returns the control of the engine 5 to the standard engine output (third stage) after the control time Tr has elapsed after the start of the control (start of the vehicle) whichever mode has been selected.

Though not shown, the start controller 13 gradually changes the engine output and smoothly proceeds from the output adjustment stage before a change to the output adjustment stage after the change in any mode when the engine output is changed, that is, when the first control time ΔTr1 proceeds to the second control time ΔTr2 and the output of the engine 5 is changed, and when the second control time ΔTr2 proceeds to the third control time ΔTr3 and the output of the engine 5 is changed.

FIGS. 4 and 5 are views illustrating other examples of the modes in the engine output adjustment control of the engine controller according to the embodiment of the present invention.

As illustrated in FIG. 4, the mode in the engine output adjustment control of the engine controller 1 according to this embodiment may be set so as to gradually increase the engine output with elapse of time. For example, in a C mode in the engine output adjustment control, the engine output is sequentially adjusted to the first stage for a period from the start of the control to the first control time ΔTr1, the second stage for a period from after the first control time ΔTr1 has elapsed to the second control time ΔTr2, and the fourth stage for a period from after the second control time ΔTr2 has elapsed to the third control time ΔTr3.

Moreover, as illustrated in FIG. 5, in the mode in the engine output adjustment control of the engine controller 1 according to this embodiment, a sum of the first control time ΔTr1, the second control time ΔTr2, and the third control time ΔTr3, that is, the control time Tr may be changed. For example, in a D mode in the engine output adjustment control, the engine output is sequentially adjusted to the third stage for a period from the start of the control to the first control time ΔTr1=0.5 seconds, the first stage for a period from after the first control time ΔTr1 has elapsed to the second control time ΔTr2=1.5 seconds, and the second stage for a period from after the second control time ΔTr2 has elapsed to the third control time ΔTr3=1.5 seconds. In this case, the control time Tr=3.5 seconds Subsequently, mode switching of the engine output adjustment control by the engine controller 1 will be described. For simplification of explanation, it is assumed that the engine output adjustment control has two modes, that is, the A mode and the B mode.

Figure 6:
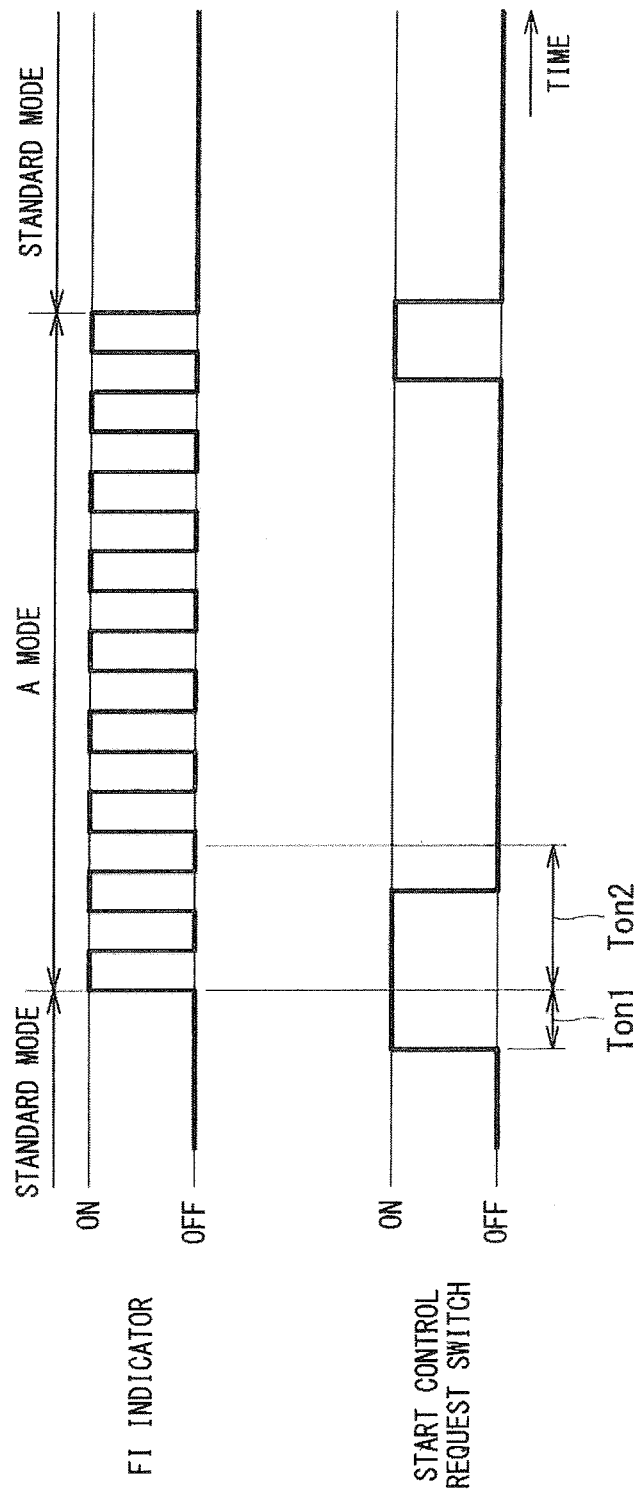
FIG. 6 is a timing chart illustrating mode switching in the engine output adjustment control by the engine controller according to the embodiment of the present invention.
Figure 7:
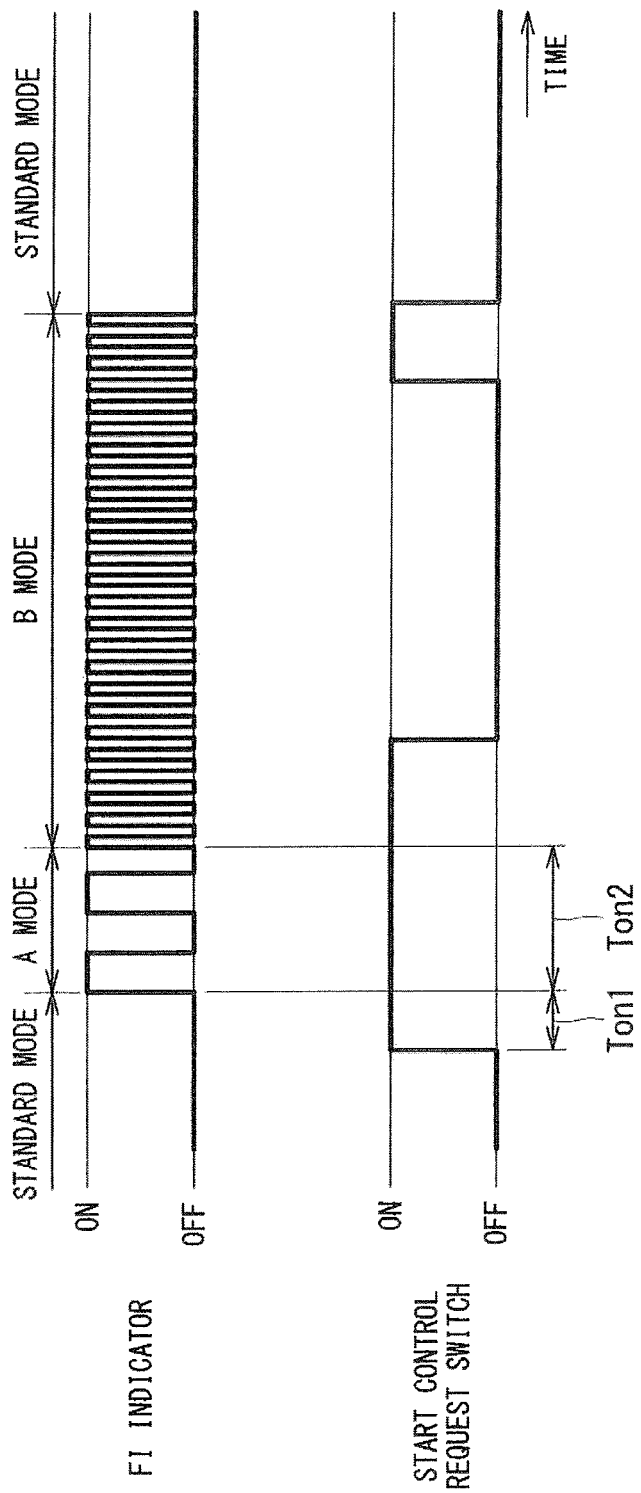
FIG. 7 is a timing chart illustrating the mode switching in the engine output adjustment control by the engine controller according to the embodiment of the present invention.

FIGS. 6 and 7 are timing charts illustrating the mode switching of the engine output adjustment control by the engine controller according to the embodiment of the present invention.

As illustrated in FIG. 6, if first input duration Ton1 determined in advance has elapsed since the start control request switch 16 is subjected to a pressing-down operation, the engine controller 1 according to this embodiment applies the A mode and controls the engine 5 and notifies the rider or the assistant that the mode has switched to the A mode by flashing the indicator lamp 23. After the first input duration Ton1 has elapsed, if the start control request switch 16 is released within second input duration Ton2 determined in advance, the engine controller 1 confirms application of the A mode and continues flashing of the indicator lamp 23 so as to notify the rider or the assistant that the engine 5 is controlled in the A mode.

Moreover, as illustrated in FIG. 7, if the first input duration Ton1 determined in advance has elapsed since the start control request switch 16 is subjected to the pressing-down operation, the engine controller 1 according to this embodiment notifies the rider or the assistant that the mode has switched to the A mode by flashing the indicator lamp 23. After that, if the pressing-down operation of the start control request switch 16 is continued and the second input duration Ton2 determined in advance has elapsed, the engine controller 1 applies the B mode so as to control the engine 5 and notifies the rider or the assistant that the mode has switched to the B mode by flashing the indicator lamp 23 in a cycle shorter than that if the A mode was selected. If the pressing-down operation of the start control request switch 16 is released after the second input duration Ton2 determined in advance has elapsed, the engine controller 1 notifies the rider or the assistant that the engine 5 is controlled in the B mode by continuing the flashing of the indicator lamp 23 in the shorter cycle.

If the start control request switch 16 is not subjected to the pressing-down operation or the pressing-down operation on the start control request switch 16 does not reach the first input duration Ton1, the engine controller 1 does not apply either mode but controls the engine 5 in the standard mode and turns off the indicator lamp 23.

Moreover, if the start control request switch 16 is subjected to the pressing-down operation again after either of the modes was selected by the operation on the start control request switch 16 and the pressing-down operation on the start control request switch 16 is finished, the engine controller 1 cancels the mode which has been applied and returns the mode to the standard mode and notifies the rider or the assistant that the mode is returned to the standard mode by turning off the indicator lamp 23. In detail, the engine controller 1 returns the mode to the standard mode and turns off the indicator lamp 23 if the start control request switch 16 is pressed down again and this pressing-down operation is finished (cancelled).

Subsequently, the output adjustment control of the engine 5 executed by the engine controller 1 at the start of the vehicle 2 will be described in detail. For facilitation of explanation, it is assumed that the engine output adjustment control has two modes, that is, the A mode and the B mode.

Figure 8:
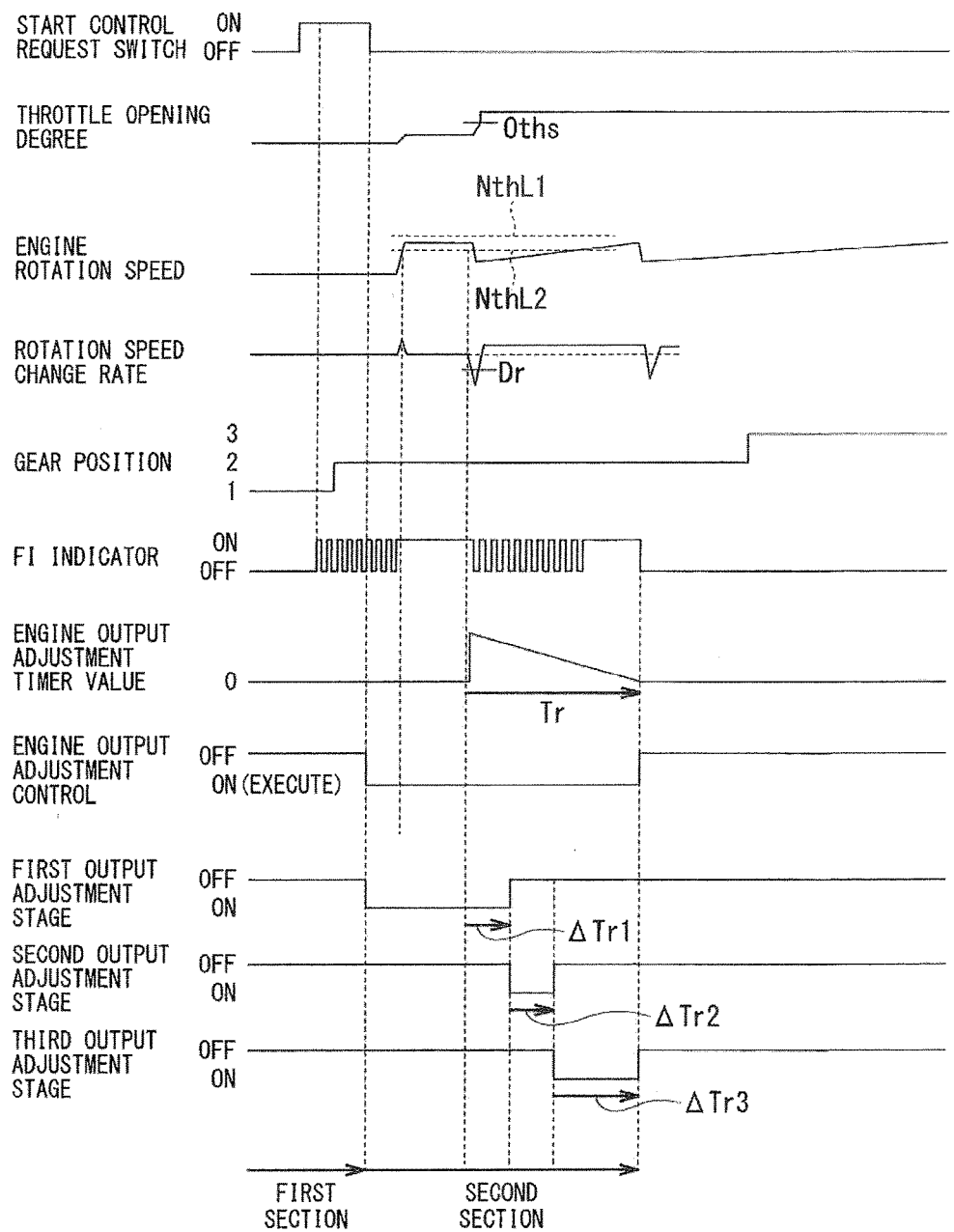
FIG. 8 is a timing chart illustrating the engine output adjustment by the engine controller according to the embodiment of the present invention.

FIG. 8 is a timing chart illustrating the engine output adjustment by the engine controller according to the embodiment of the present invention.

Figure 9:
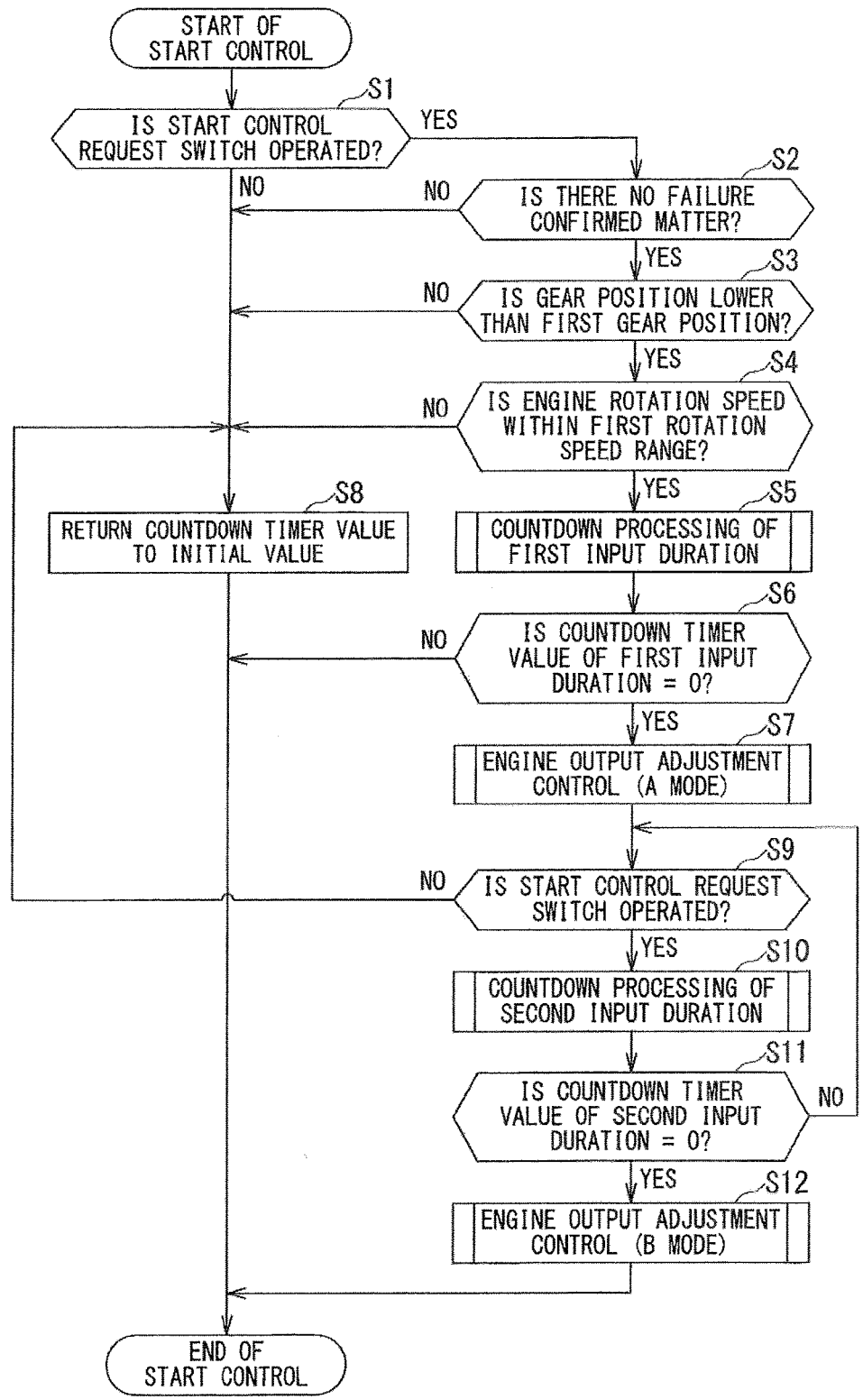
FIG. 9 is a flowchart illustrating the start control by the engine output adjustment of the engine controller according to the embodiment of the present invention.

FIG. 9 is a flowchart illustrating start control of the engine output adjustment by the engine controller according to the embodiment of the present invention.

In the start control in FIG. 9, a condition is determined in a first section of FIG. 8. If the condition of the start control is satisfied, the routine proceeds to the engine output adjustment control.

As illustrated in FIGS. 8 and 9, the start determinator 11 of the engine controller 1 according to this embodiment starts the engine output adjustment control (Step S7) if all the conditions that the start control request switch 16 is subjected to the pressing-down operation (Step S1: Yes), the gear position GP of the transmission 26 connected to the engine 5 is at a stage lower than a first position P1 determined in advance (Step S3: Yes), and the rotation speed Ne of the engine 5 is within a first rotation speed range determined in advance (NthL1≤rotation speed Ne≤NthH1) (Step S4: Yes) are satisfied.

The first position P1 is a third gear, for example, and Step S3 is satisfied if the gear position GP of the transmission 26 is at any one of the neutral position, the first gear, and the second gear.

The first rotation speed range (NthL1≤rotation speed Ne≤NthH1) at Step S4 is a range in which idling of the engine 5 can be confirmed.

Moreover, in order to avoid a misoperation of the engine output adjustment control and in order to enable selection of a mode by the single start control request switch 16, the start determinator 11 executes countdown processing of the first input duration Ton1 on a premise of satisfaction of the conditions in Step S1 to Step S4 (Step S5). The start determinator 11 starts the engine output adjustment control (A mode) (Step S7) if a countdown timer value of the first input duration Ton1 reaches a zero value (Step S6: Yes).

If the countdown timer value of the first input duration Ton1 does not reach the zero value (Step S6: No), the start determinator 11 does not start the engine output adjustment control (Step S7) but repeats the processing from Step S1 again and repeats the countdown processing (Step S5) if the conditions from Step S1 to Step S4 are satisfied. That is, the start determinator 11 holds start of the engine output adjustment control until the conditions from Step S1 to Step S4 are satisfied and predetermined time (the first input duration Ton1) has elapsed in that state.

Moreover, if even any one of the conditions from Step S1 to Step S4 is not satisfied (Step S1: No, Step S2: No, Step S3: No, Step S4: No), the start determinator 11 initializes the countdown timer value of the first input duration Ton1 (Step S8) and bypasses the engine output adjustment control, that is, finishes the processing without execution.

The start control request switch 16 can be installed individually for each mode, but in the start determinator 11 of the engine controller 1 according to this embodiment, the mode can be selected by the single start control request switch 16 in order to reduce a weight and a size of the device, and the mode is switched in order by the operation time of the start control request switch 16. Thus, after start of the engine output adjustment control (A mode) in which the map 28 for a low output for keeping the output of the engine 5 lower than the standard ignition timing which is the first ignition timing correction map (Step S7) is applied, the start determinator 11 checks that the start control request switch 16 is still subjected to the pressing-down operation (Step S9: Yes) and executes the countdown processing of the second input duration Ton2 (Step S10) on the premise of satisfaction of the condition at Step S9. The start determinator 11 starts the engine output adjustment control (B mode) (Step S12) if the countdown timer value of the second input duration Ton2 reaches the zero value (Step S11: Yes).

The start determinator 11 returns to Step S9 again if the countdown timer value of the second input duration Ton2 does not reach the zero value (Step S11: No) and executes the countdown processing (Step S10) if the start control request switch 16 is still subjected to the pressing-down operation (Step S9: Yes). That is, the start determinator 11 holds start of the engine output adjustment control (B mode) until the predetermined time (the second input duration Ton2) has elapsed if the start control request switch 16 is still subjected to the pressing-down operation after the start of the engine output adjustment control (A mode) (Step S7).

Moreover, if the pressing-down operation of the start control request switch 16 is released and the condition at Step S9 is not satisfied (Step S9: No), the start determinator 11 does not apply the engine output adjustment control (B mode) but maintains the engine output adjustment control (A mode) which has been already applied, initializes the countdown timer values of the first input duration Ton1 and the second input duration Ton2 (Step S8) and finishes the processing.

If the engine output adjustment control is started (Step S7 or Step S12), the engine controller 1 turns on or flashes the indicator lamp 23 in a pattern corresponding to the A mode or the B mode and notifies the rider or the assistant that the engine output adjustment control has been started.

Figure 10:
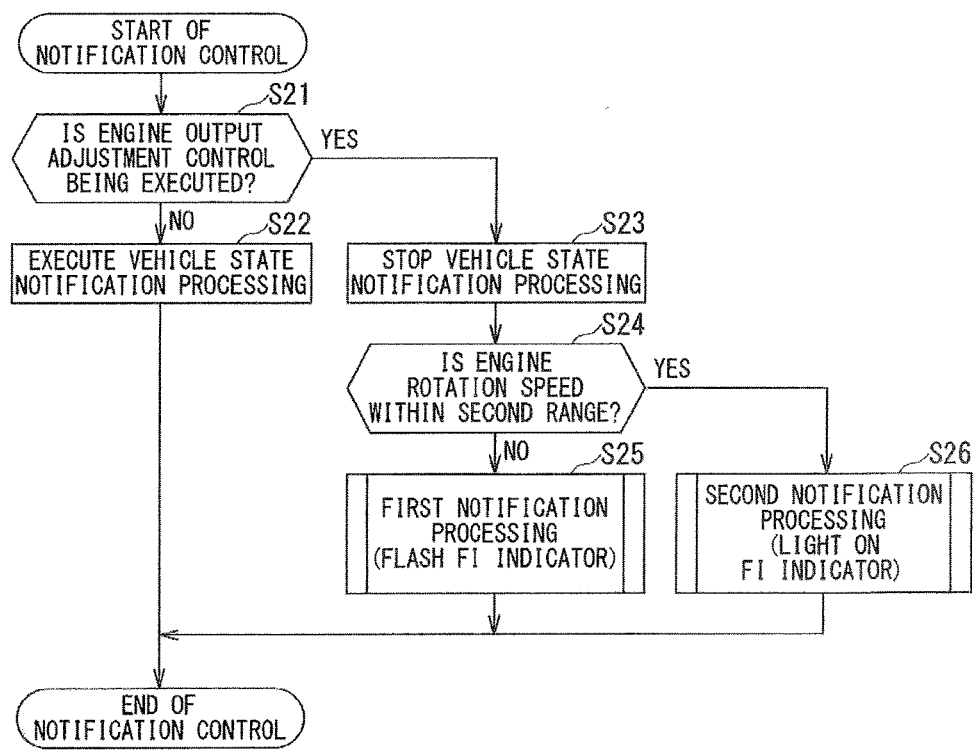
FIG. 10 is a flowchart illustrating notification control by the engine controller according to the embodiment of the present invention.

FIG. 10 is a flowchart illustrating the notification control by the engine controller according to the embodiment of the present invention.

As illustrated in FIG. 10, the engine controller 1 according to this embodiment monitors presence of abnormality of the vehicle 2 at all times, and if the engine output adjustment control is not executed (Step S21: No), the engine controller 1 executes state notification processing of the vehicle 2 (Step S22) by a pattern different from the pattern of any of turning-off, turning-on, and flashing of the indicator lamp 23 indicating that the engine output adjustment control is being executed.

The start controller 13 of the engine controller 1 notifies a state of the engine output adjustment control or a situation of the rotation speed Ne of the engine 5 which satisfies an execution condition of the engine output adjustment control by the pattern of turning-on or flashing of the indicator lamp 23. Specifically, the engine controller 1 stops the state notification processing of the vehicle 2 once (Step S23) if the engine output adjustment control is executed (Step S21: Yes) and monitors the rotation speed Ne of the engine 5 (Step S24).

Then, if the rotation speed Ne of the engine 5 is not within a second rotation speed range (NthL2≤rotation speed Ne≤NthH2) determined in advance (Step S24: No), the engine controller 1 executes first notification processing by flashing the indicator lamp 23 (Step S25) and notifies the rider or the assistant that the engine output adjustment control is executed and the executed (selected) mode of the engine output adjustment control. If the rotation speed Ne of the engine 5 is within the second rotation speed range (NthL2≤rotation speed Ne≤NthH2) determined in advance (Step S24: Yes), the engine controller 1 turns on the indicator lamp 23 and executes second notification processing (Step S26) and notifies the rider or the assistant that the rotation speed Ne of the engine 5 under the engine output adjustment control is within a recommended start preparation rotation speed range.

The predetermined second rotation speed range (NthL2≤rotation speed Ne≤NthH2) is the rotation speed Ne of the engine 5 which is an index when the rider operates the throttle at start. If the indicator lamp 23 makes notification by the second notification processing, the rider can know that the rotation speed Ne of the engine 5 is within the start preparation rotation speed range. Then, if the rider further opens the throttle and this notification state has elapsed and the notification is changed to notification of the control mode of the executed (selected) engine output adjustment control or the like, the rider can easily determine that the rotation speed Ne of the engine 5 is in the state within this range or more. In the case of a race vehicle such as the vehicle 2 which is not provided with a tachometer displaying the rotation speed Ne of the engine 5 or at a race start when a peripheral noise is too large to hear engine sound of the vehicle itself, notification by the indicator lamp 23 is particularly effective.

If the rotation speed Ne of the engine 5 further rises largely exceeding the predetermined second rotation speed range (NthL2≤rotation speed Ne≤NthH2), over-rotation prevention control of the engine 5 works, and unique vibration occurs. Thus, the rider can determine that the rotation speed Ne of the engine 5 reaches a rotation speed at which the over-rotation prevention control works from this unique vibration. That is, the rider can determine in which of the predetermined second rotation speed range (NthL2≤rotation speed Ne≤NthH2), or a range from the predetermined second rotation speed range (NthL2≤rotation speed Ne≤NthH2) to the rotation speed at which the over-rotation prevention control works, or the rotation speed at which the over-rotation prevention control works or more, that the rotation speed Ne of the engine 5 is located.

Figure 11:
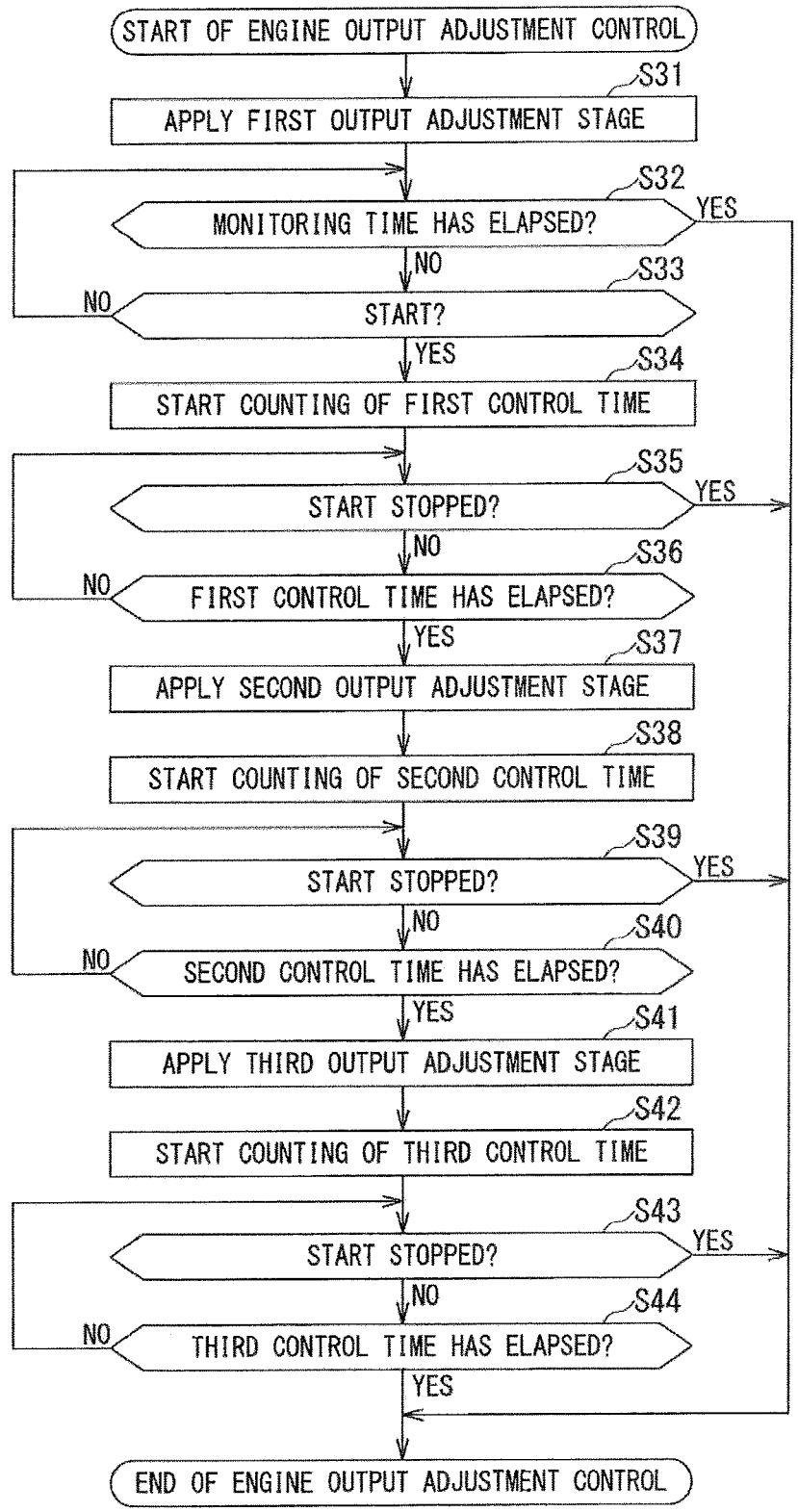
FIG. 11 is a flowchart illustrating the engine output adjustment control by the engine controller according to the embodiment of the present invention.

FIG. 11 is a flowchart illustrating the engine output adjustment control by the engine controller according to the embodiment of the present invention.

The engine output adjustment control in FIG. 11 is executed in the second section in FIG. 8.

As illustrated in FIG. 11, the start controller 13 of the engine controller 1 according to this embodiment applies a first output adjustment stage (fourth stage in the case of the A mode) applied to the first control time ΔTr1 if the start control (mode selection) proceeds to the engine output adjustment control (Step S31) and monitors the start of the vehicle 2 (Step S33). However, if monitoring time Tw determined in advance has elapsed after either one of the modes is selected by the start control request switch 16 (Step S32; Yes), the start controller 13 finishes the engine output adjustment control and returns to the standard mode.

If the time is within the monitoring time Tw determined in advance after either one of the modes is selected by the start control request switch 16 (Step S32: No), the start controller 13 monitors the start determinator 11 and determines whether or not the vehicle 2 has started (Step S33). The start controller 13 returns to Step S32 and continuously monitors whether or not the monitoring time Tw has elapsed until the vehicle 2 starts (Step S33: No).

Details of a start determination of the vehicle 2 at Step S33 will be described later.

If the vehicle 2 starts (Step S33: Yes), the start controller 13 controls the engine output in the first output adjustment stage until the first control time ΔTr1 has elapsed since start of the vehicle (Step S34, Step S36: No). The start controller 13 determines a stop determination condition of the engine output adjustment control which will be described later while controlling the engine output in the first output adjustment stage (Step S35).

If the first control time ΔTr1 has elapsed (Step S36: Yes), the start controller 13 applies a second output adjustment stage applied to the second control time ΔTr2 (second stage in the case of the A mode) (Step S37) and controls the engine output in the second output adjustment stage until the second control time ΔTr2 has elapsed (Step S38, Step S40: No). The start controller 13 determines the stop determination condition of the engine output adjustment control which will be described later while controlling the engine output in the second output adjustment stage (Step S39).

If the second control time ΔTr2 has elapsed (Step S40: Yes), the start controller 13 applies a third output adjustment stage applied to the third control time ΔTr3 (fifth stage in the case of the A mode) (Step S41) and controls the engine output in the third output adjustment stage until the third control time ΔTr3 has elapsed (Step S42, Step S44: No). The start controller 13 determines the stop determination condition of the engine output adjustment control which will be described later while controlling the engine output in the third output adjustment stage (Step S43).

Then, if the third control time ΔTr3 has elapsed, that is, if the elapsed time Tp since start of the vehicle 2 reaches the control time Tr (Step S44: Yes), the start controller 13 finishes the engine output adjustment control.

Though not shown, if the elapsed time Tp since start of the vehicle 2 reaches the control time Tr and the engine output adjustment control is finished, the start controller 13 gradually brings the engine output close to the standard mode and smoothly proceeds to the standard mode.

Figure 12:
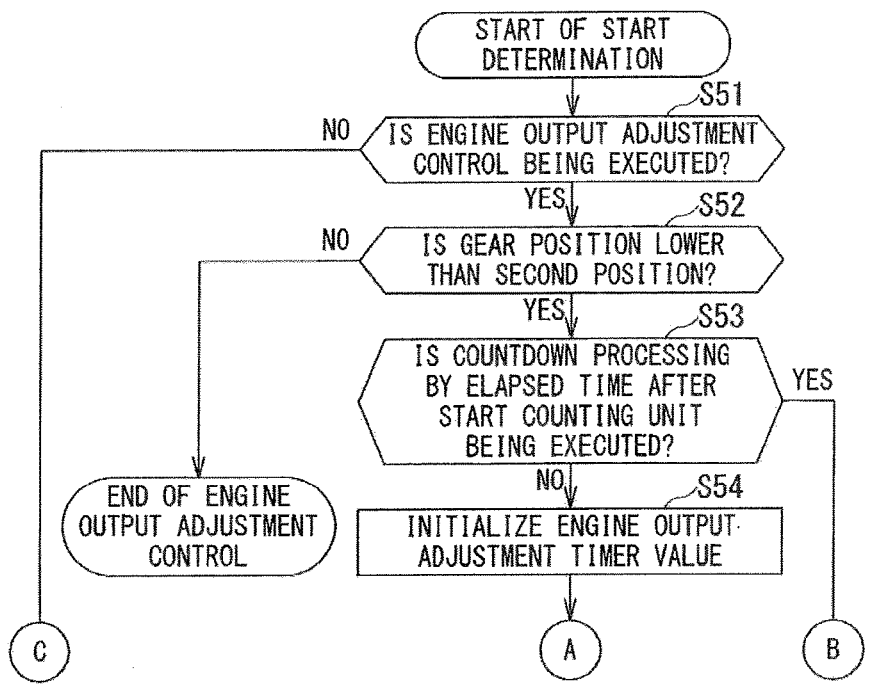
FIG. 12 and FIG. 13 are a flowchart illustrating a start determining condition of the engine output adjustment control by the engine controller according to the embodiment of the present invention.
Figure 13:
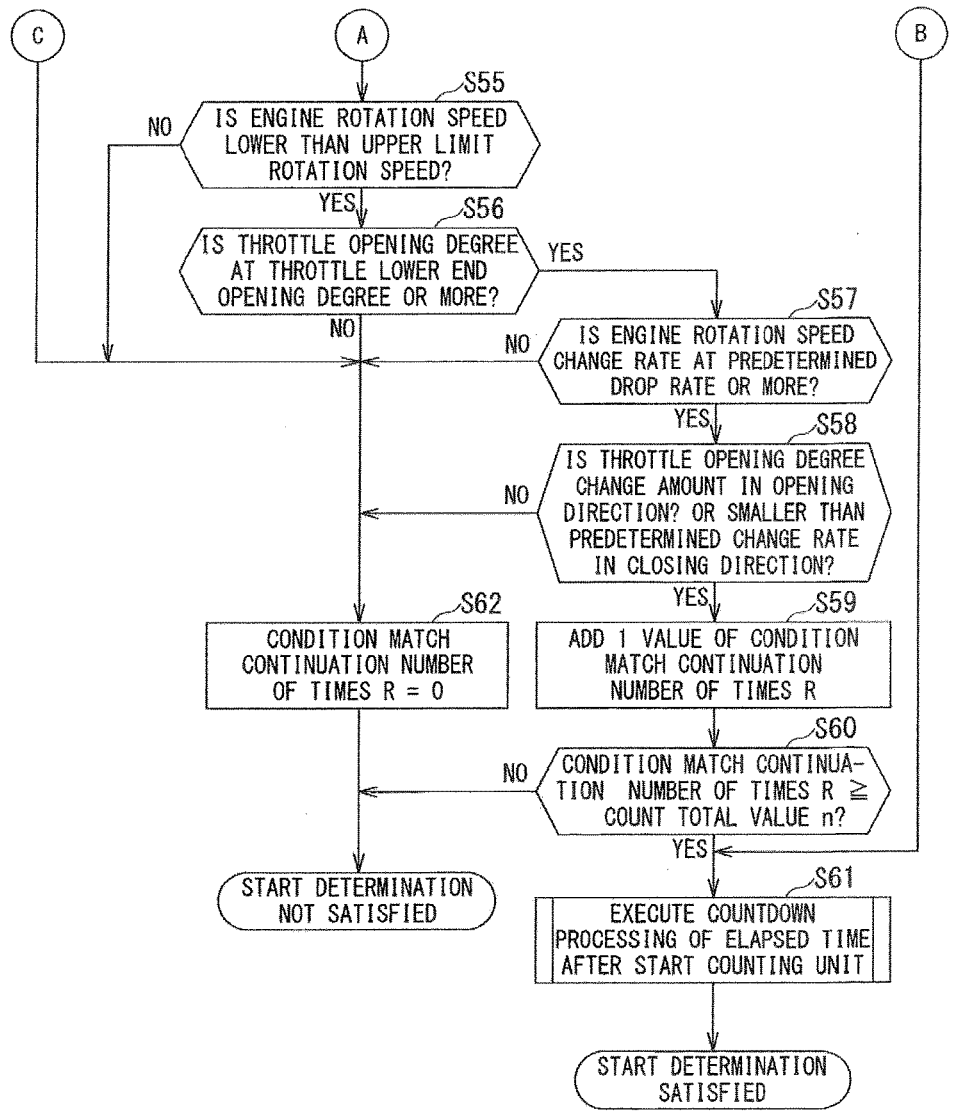

FIG. 12 and FIG. 13 are a flowchart illustrating a start determination condition of the engine output adjustment control by the engine controller according to the embodiment of the present invention.

The start determination condition of the engine output adjustment in FIG. 12 and FIG. 13 are executed at Step S33 in FIG. 11.

As illustrated in FIGS. 8, 12 and 13, the start determinator 11 of the engine controller 1 according to this embodiment starts determination on whether or not the vehicle 2 has started subsequent to Step S32 illustrated in FIG. 11 and determines start of the vehicle 2 if a change rate ΔNe of the rotation speed Ne of the engine 5 is larger than a drop rate Dr determined in advance.

Moreover, the start determinator 11 determines start of the vehicle 2 if the rotation speed Ne of the engine 5 is lower than an upper limit rotation speed Nes determined in advance. In other words, the start determinator 11 suppresses start determination of the vehicle 2 if the rotation speed Ne of the engine 5 is at the upper limit rotation speed Nes determined in advance or more.

Moreover, the start determinator 11 determines start of the vehicle 2 if the throttle opening degree θ is at a throttle lower limit opening degree Oths determined in advance in accordance with the rotation speed Ne of the engine 5 or more. In other words, the start determinator 11 suppresses determination of start of the vehicle 2 if the throttle opening degree θ is smaller than a throttle lower limit opening degree Oths determined in accordance with the rotation speed Ne of the engine 5 in advance.

Specifically, if all the conditions that the engine output adjustment control is being executed (Step S51: Yes), the gear position GP of the transmission 26 is at a stage lower than the second position P2 determined in advance (Step S52: Yes) and the countdown processing of the elapsed timer 12 is not executed (Step S53: No) are satisfied, the start determinator 11 initializes the engine output adjustment timer value and sets it to the control time Tr determined in advance (Step S54).

Moreover, if all the conditions that the rotation speed Ne of the engine 5 is lower than the upper limit rotation speed Nes determined in advance (Step S55: Yes), the throttle opening degree θ of the engine 5 is at the throttle lower limit opening degree Oths determined in advance in accordance with the rotation speed Ne of the engine 5 or more (Step S56: Yes), the change rate ΔNe of the rotation speed Ne of the engine 5 is at the drop rate Dr determined in advance or more (Step S57: Yes), and the change rate Δθ of the throttle opening degree θ of the engine 5 is in an opening direction or in a closing direction and smaller than a change rate ΔθDr determined in advance (Step S58: Yes) are satisfied, the start determinator 11 adds a 1 value to a condition match continuation number of times R (Step S59).

Then, the start determinator 11 holds proceeding to the subsequent processing, that is, the countdown processing of the elapsed timer 12 (Step S61) until the condition match continuation number of times R becomes a count total value n determined in advance or more in order to reliably determine start of the vehicle 2 (Step S60: No). If the condition match continuation number of times R becomes the predetermined count total value n or more (Step S60: Yes), the start determinator 11 determines start of the vehicle 2, the countdown processing of the elapsed timer 12 is executed (Step S61), and the start determinator 11 satisfies the start determining condition of the vehicle 2.

The change rate ΔNe at Step S57 catches a phenomenon in which the rotation speed Ne of the engine 5 lowers by a load of the rear wheel 8 which is the driving wheel since the clutch (not shown) is to be engaged. By means of an increase of the change rate ΔNe larger than the predetermined drop rate Dr, in other words, by means of a drop of the rotation speed Ne of the engine 5 larger than the drop rate Dr, the start determinator 11 satisfies the start determining condition of the vehicle 2.

If even any one of conditions at Step S51, at Step S55, at Step S56, at Step S57, and at Step S58 is not satisfied (Step S51: No, Step S55: No, Step S56: No, Step S57: No or Step S58: No), the start determinator 11 initializes the count value of the condition match continuation number of times R (Step S62), and determines non-establishment of the start determination of the vehicle 2. Moreover, if the condition at Step S60 is not satisfied (Step S60: No), while the count value of the condition match continuation number of times R is held as it is, the start determination of the vehicle 2 is made unestablished.

The start determinator 11 of the engine controller 1 according to this embodiment determines at Step S57 that the clutch (not shown) is to be engaged, and the rotation speed Ne of the engine 5 is temporarily lowered larger than the drop rate Dr, but instead of this, by using a clutch state detector (not shown) for detecting engagement/disengagement of the clutch, the start determination can be made by detecting an engaged state of the clutch. However, since it needs the clutch state detector separately, the determination by the drop rate Dr of the rotation speed Ne of the engine 5 can contribute to weight and size reduction of the vehicle.

Moreover, at Step S58, drop of the rotation speed Ne of the engine 5 larger than the drop rate Dr is detected at Step S57. Step S58 prevents erroneous determination to be start of the drop of the rotation speed Ne of the engine 5 caused by a returning (closing) operation of the throttle by the rider. That is, if the rider returns the throttle once due to hesitation to start or the like and the engine 5 returns to an idle state, erroneous execution of the countdown processing of the elapsed timer 12 is prevented.

Moreover, the start determinator 11 reliably determines start of the vehicle 2 at Step S59 and Step S50. That is, in FIG. 8, the drop of the rotation speed Ne is schematically illustrated, but the drop rate Dr detected at Step S57 is a change of the rotation speed Ne in an extremely short period of time and is a change of rotating time per cycle of the crank shaft 25 from the crank pulse generator 17 or a change acquired from comparison with rotating time 1 cycle before the same rotation section of the crank shaft 25 and thus, it is likely that an instantaneous drop of the rotation speed Ne caused by disturbance other than the start operation (clutch operation) is erroneously determined to be start. Thus, the start determinator 11 prevents erroneous determination to be started only by the instantaneous drop of the rotation speed Ne caused by the disturbance at Step S57 and holds proceeding to the countdown processing of the elapsed timer 12 (Step S61) until the condition match continuation number of times R becomes the count total value n or more at which the start operation (clutch operation) by the rider is reliably inferred (Step S60: No). The count total value n is set to an appropriate integer value of 2 or more in order to prevent misdetermination of start or the count total value n=10, for example.

If the friction coefficient of the road surface on which the rear wheel 8 is grounded is extremely small, the rider slightly twists the throttle grip (not shown), that is, slightly opens the throttle valve 15 in fear of idling of the rear wheel 8 in some cases. In this case, the throttle opening degree θ falls below the throttle lower limit opening degree Oths and the condition match continuation number of times R is not counted, and the routine does not proceed to the countdown processing of the elapsed timer 12 and thus, the start determinator 11 holds the state in which the output is adjusted (Step S56: No, Step S62).

Moreover, if the gear position GP of the transmission 26 changes to the second position P2 determined in advance or more (Step S52: No), the start controller 13 finishes the engine output adjustment control even before the elapsed time Tp measured by the elapsed timer 12 reaches the control time Tr. That is because it can be determined that the transmission 26 is in a state in which the transmission 26 has been already shifted to a high-speed stage by the rider and the control for start is not needed any more.

If the start of the vehicle 2 is determined and the countdown processing of the elapsed timer 12 is executed (Step S61), determination that the countdown processing of the elapsed timer 12 is being executed is made at Step S53 (Step S53: Yes), and the states of the rotation speed Ne of the engine 5 (Step S55) and the throttle opening degree θ of the engine 5 (Step S56) which are premise conditions for determination at Step S57 do not affect the countdown processing of the elapsed timer 12.

If a fully closed state of the throttle opening degree θ of the engine 5 (a state of substantially fully closed including an opening degree state close to fully closed) reaches predetermined fully closed duration determined in advance, the start controller 13 may finish the engine output adjustment control even before the elapsed time Tp measured by the elapsed timer 12 reaches the predetermined control time Tr (not shown). Moreover, the start controller 13 may finish the engine output adjustment control also if the start control request switch 16 is subjected to the pressing-down operation during execution of the engine output adjustment control (not shown). The start controller 13 may finish the engine output adjustment control also if the predetermined total control time T or 180 seconds, for example, has elapsed since the first input duration Ton1 (not shown). In this case, the start controller 13 can finish the engine output adjustment control of the vehicle 2 which has started without being able to detect a drop of the rotation speed Ne of the engine 5 larger than the drop rate Dr.

Moreover, the start controller 13 notifies the rider that the engine output adjustment control is being executed by flashing the indicator lamp 23 in a predetermined pattern determined in advance for each mode during execution of the engine output adjustment control. Particularly, in the case of the vehicle 2 not provided with a tachometer for displaying the rotation speed Ne of the engine 5, it is difficult to know whether or not the rotation speed Ne of the engine 5 at start is within the second rotation speed range (NthL2≤rotation speed Ne≤NthH2) and thus, the engine controller 1 notifies that the rotation speed Ne of the engine 5 is within the second rotation speed range (NthL2≤rotation speed Ne≤NthH2) during execution of the engine output adjustment control by lighting the indicator lamp 23.

Moreover, instead of notification that the rotation speed Ne of the engine 5 is within the second rotation speed range (NthL2≤rotation speed Ne≤NthH2), the engine controller 1 may change a flashing cycle of the indicator lamp 23 by correlating it with the rotation speed Ne of the engine 5. The rider can estimate the rotation speed Ne of the engine 5 from the flashing cycle of the indicator lamp 23.

The notification relating to execution of the engine output adjustment control, the notification that the rotation speed Ne of the engine 5 is within the second rotation speed range (NthL2≤rotation speed Ne≤NthH2), and the flashing notification of the rotation speed Ne of the engine 5 may be made by providing a light emitting device such as an LED, a light bulb and the like separately from the indicator lamp 23 according to this embodiment.

Figure 14:
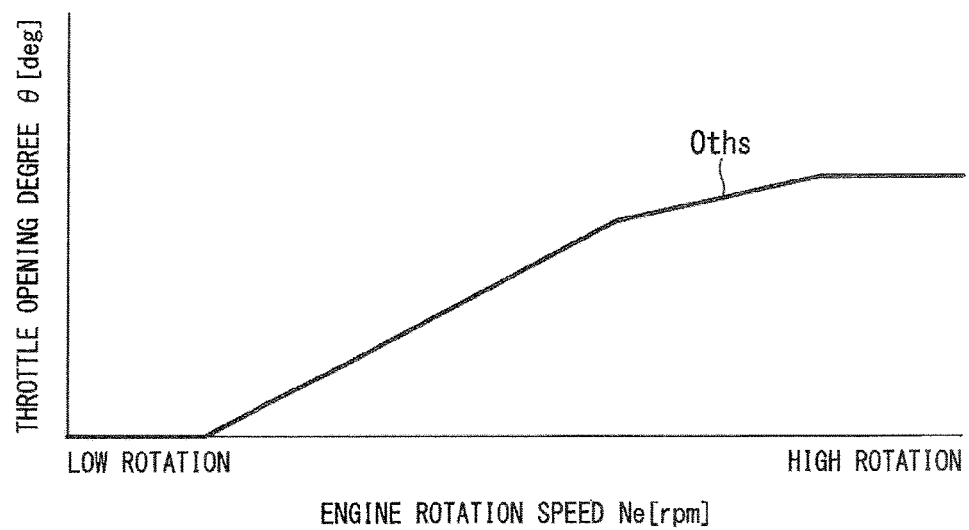
FIG. 14 is a view illustrating setting contents of a throttle lower limit opening degree in the engine controller according to the embodiment of the present invention.

FIG. 14 is a view illustrating setting (Step S56) contents of the throttle lower limit opening degree in the engine controller according to the embodiment of the present invention.

As illustrated in FIG. 14, the throttle lower limit opening degree Oths of the engine controller 1 according to this embodiment is determined in accordance with the rotation speed Ne of the engine 5 and is set to be constant at a lower opening degree in a low rotation speed region of the rotation speed Ne of the engine 5 and to be constant at a higher opening degree in a high rotation speed region of the rotation speed Ne of the engine 5, but a set opening degree becomes larger with a rise of the rotation speed Ne of the engine 5 in a wide rotation region from the low rotation region to the high rotation region. The throttle lower limit opening degree Oths is set to a side where the throttle is opened more than this curve with the rotation speed Ne of the same engine 5 as compared with a curve indicating a relation between the rotation speed Ne of the engine 5 when the throttle is gradually opened in a non-load state (clutch disengaged state) of the vehicle 2 and the throttle opening degree.

Figure 15:
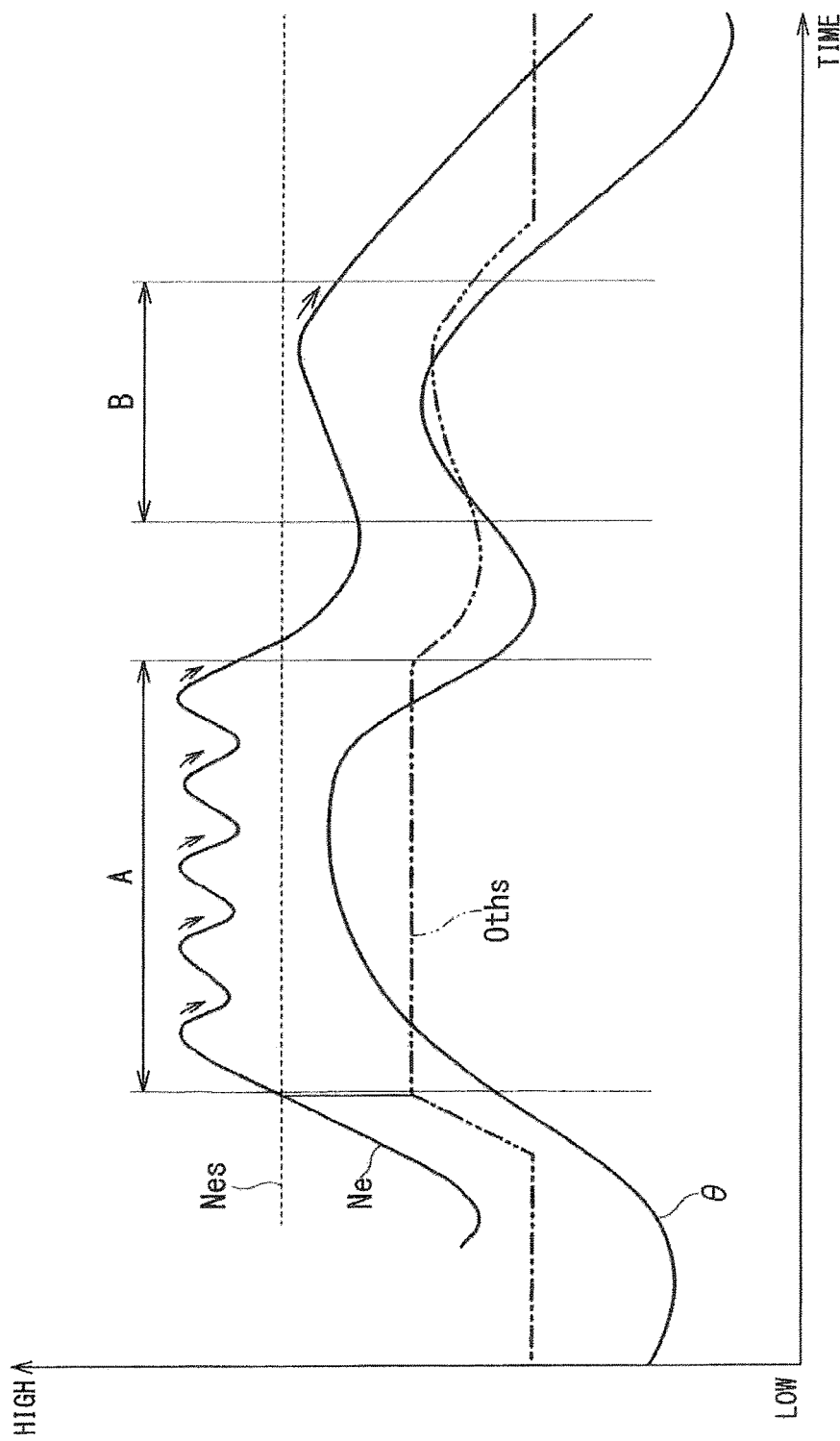
FIG. 15 is a view illustrating an example of changes of a throttle opening degree and an engine rotation speed in the engine controller according to the embodiment of the present invention.

FIG. 15 is a view illustrating an example of changes of the throttle opening degree and the engine rotation speed in the engine controller according to the embodiment of the present invention.

The start determinator 11 of the engine controller 1 according to this embodiment detects that the clutch (not shown) is to be engaged at Step S57 and the rotation speed Ne of the engine 5 temporarily drops more largely than the drop rate Dr and determines it to be start, but the engine controller 1 incorporates a rev-limiter control for protecting the engine 5 by controlling such that the rotation speed Ne of the engine 5 does not become too high in order to prevent over-rotation of the engine 5 in some cases.

In this case, the engine controller 1 according to this embodiment lowers (downward arrow in FIG. 15) the rotation speed Ne of the engine 5 when the rev-limiter operates as illustrated in FIG. 15 (section A in FIG. 15). If the change rate ΔNe of the rotation speed Ne of the engine 5 lowers more largely than the drop rate Dr determined in advance by the rev-limiter, there is a concern that the start determinator 11 erroneously determines that the vehicle 2 has started.

Thus, by monitoring that the rotation speed Ne of the engine 5 is lower than the upper limit rotation speed Nes determined in advance (Step S55), the engine controller 1 according to this embodiment avoids mis-determination on start of the vehicle 2 by the start determinator 11 even if the change rate of the rotation speed Ne of the engine 5 lowers more largely than the drop rate Dr determined in advance by the rev-limiter. That is, in order that a fluctuation range of the rotation speed Ne of the engine 5 by the rev-limiter is not used for start determination, the upper limit rotation speed Nes is set to a lower rotation side than the fluctuation range of the rotation speed Ne of the engine 5 by the rev-limiter.

Moreover, if the rider performs an operation of increasing or decreasing the throttle opening degree θ (section B in FIG. 15) by twisting the throttle grip like so-called idling, the engine controller 1 changes the rotation speed Ne of the engine 5 (downward arrow in FIG. 15). Then, if the change rate ΔNe of the rotation speed Ne of the engine 5 drops more largely than the drop rate Dr determined in advance by the accelerator grip operation, there is a concern that the start determinator 11 mis-determines that the vehicle 2 has started.

Thus, if the throttle opening degree θ becomes smaller than the throttle lower limit opening degree Oths, the engine controller 1 according to this embodiment suppresses the start determination of the vehicle 2 (Step S56) and infers the rider's will to start by using the conditions that the change rate ΔB of the throttle opening degree θ of the engine 5 is in the opening direction or in the closing direction and is smaller than the change rate ΔθDr determined in advance (Step S58) for start determination and avoids the mis-determination on start of the vehicle 2 by the throttle gripping operation.

Figure 16:
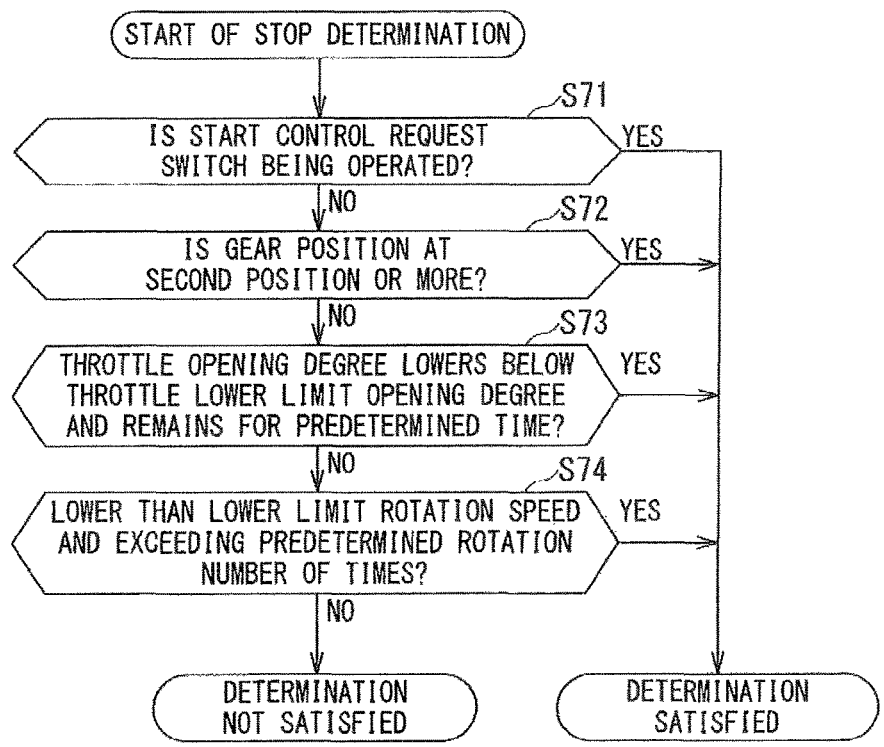
FIG. 16 is a flowchart illustrating a stop determination condition of the engine output adjustment control by the engine controller according to the embodiment of the present invention.

FIG. 16 is a flowchart illustrating a stop determination condition of the engine output adjustment control by the engine controller according to the embodiment of the present invention.

The stop determination condition of the engine output adjustment in FIG. 16 is executed at Step S35, at Step S39, and at Step S43 in FIG. 11.

As illustrated in FIG. 16, the start controller 13 of the engine controller 1 according to this embodiment determines that the stop determination condition of the engine output adjustment control is satisfied if any one of the conditions is satisfied during the engine output adjustment control, that is, the start control request switch 16 is subjected to the pressing-down operation again (Step S71: Yes), the gear position GP of the transmission 26 is at the second position P2 determined in advance or more (a gear position at the fourth gear or more, for example) (Step S72: Yes), the throttle opening degree θ of the engine 5 falls below the throttle lower limit opening degree Oths determined in advance and duration determined in advance or 2 seconds, for example, has elapsed (Step S73: Yes), and the rotation speed Ne of the engine 5 is lower than a lower limit rotation speed Nes2 determined in advance (rotation speed of approximately 1.5 times of an idling rotation speed, for example), and higher than the rotation speed Nn determined in advance or 100 rotations, for example (Step S74: Yes).

On the other hand, the start controller 13 determines non-establishment of the stop determination condition of the engine output adjustment control if none of Step S71 to Step S74 is satisfied (Step S71: No, Step S72: No, Step S73: No, Step S74: No) during the engine output adjustment control.

The engine controller 1 according to this embodiment can easily exert acceleration performances of the vehicle by executing the engine output adjustment control for changing the output of the engine 5 in multiple stages until the elapsed time Tp measured by the elapsed timer 12 reaches the predetermined control time Tr determined in advance and thus, the acceleration performances of the vehicle 2 itself can be easily used without forcing mental strain to the rider for the excessive engine output adjustment operation (control operation of a driving force by a clutch operation and a throttle operation) at the start.

Moreover, the engine controller 1 according to this embodiment can easily exert the acceleration performances of the vehicle by executing the engine output adjustment control for changing the output of the engine 5 in the multiple stages until the elapsed time Tp measured by the elapsed timer 12 reaches the predetermined control time Tr determined in advance and thus, the engine output adjustment corresponding to a behavior of the vehicle 2 at start can be made, and the acceleration performances of the vehicle 2 itself can be easily used.

Moreover, in the engine controller 1 according to this embodiment, a change to an output lower at least than the standard output is included in the change in the multiple stages of the engine output and thus, a behavior of the vehicle 2 at start is made stable, and the acceleration performances of the vehicle 2 itself can be easily used.

Furthermore, the engine controller 1 according to this embodiment can be applied to start on a bad road and start on a slope by various motorcycles by providing the start control request switch 16 for mode switching so as to increase usability.

Furthermore, in the engine controller 1 according to this embodiment, by providing a plurality of modes differing in at least either one of size of engine outputs and duration in each of stages with different engine outputs, usability can be further increased, and the engine controller 1 can be applied to start on a bad road or start on a slope by various motorcycles.

Moreover, the engine controller 1 according to this embodiment can determine start of the vehicle 2 by monitoring the change rate ΔNe of the rotation speed Ne of the engine 5 and detect start of the vehicle 2 with accuracy and finish the engine output adjustment control in predetermined time after start since it executes the engine output adjustment control and thus, the engine output adjustment control at start can be applied only for required time without interfering with the subsequent running and the acceleration performances of the vehicle 2 itself can easily exert at acceleration or running after predetermined time has elapsed since start.

Moreover, the engine controller 1 according to this embodiment can determine start of the vehicle 2 more accurately even for a vehicle equipped with the rev-limiter by suppressing start determination of the vehicle 2 if the rotation speed Ne of the engine 5 is at the upper limit rotation speed Nes or more.

Furthermore, the engine controller 1 according to this embodiment avoids mis-determination on start of the vehicle 2 by the throttle gripping operation by suppressing start determination of the vehicle 2 if the throttle opening degree θ of the engine 5 is smaller than the throttle lower limit opening degree Oths determined in accordance with the rotation speed Ne of the engine 5.

Moreover, the engine controller 1 according to this embodiment monitors the condition match continuation number of times R (Step S59, Step S60) and thus, even if the throttle opening degree θ temporarily becomes the start preparation opening degree Oths or more, the condition match continuation number of times R is not added if the throttle opening degree θ becomes smaller than the start preparation opening degree Oths after that, the routine does not proceed to the countdown processing of the elapsed timer 12, and the engine output adjustment state can be continued.

Moreover, the engine controller 1 according to this embodiment can immediately exert running performances of the vehicle 2 itself at timing when the rider smoothly accelerates the vehicle 2 and reaches normal running by finishing the engine output adjustment control if the gear position GP of the transmission 26 changes to the predetermined second position P2 determined in advance or more. That is, the rider can finish the control by an intentional shift-up operation.

Furthermore, the engine controller 1 according to this embodiment can immediately exert the running performances of the vehicle 2 itself in a situation in which the throttle is closed in order to quickly enter a corner after start of the vehicle 2 in a race scene or the like by finishing the engine output adjustment control even before the elapsed time Tp measured by the elapsed timer 12 reaches the predetermined control time Tr if the fully closed state of the throttle opening degree of the engine 5 reaches the predetermined fully closed duration determined in advance. That is, the rider can finish the control by an intentional throttle operation.

Moreover, the engine controller 1 according to this embodiment can allow the engine output adjustment control to effectively function by notifying the selected mode of the engine output adjustment control, the situation of the rotation speed Ne of the engine 5 satisfying the execution condition of the engine output adjustment control and the like to the rider or the assistance so as to notify the rider that the engine rotation speed at start is appropriate through lighting-on and flashing of the indicator lamp 23. Moreover, the engine controller 1 according to this embodiment can constitute an inexpensive system by notification control using the indicator lamp 23 without requiring a device for displaying the rotation speed Ne of the engine 5 such as a tachometer.

Therefore, according to the engine controller 1 according to the present invention, the operation at start of the vehicle 2 can be made easily without giving mental strain for canceling the start control to the rider.

While certain embodiment has been described, this embodiment has been presented by way of example only, and is not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

REFERENCE SIGNS LIST 1 engine controller
2 vehicle
3 vehicle body
5 engine
6 front wheel
7 steering mechanism
8 rear wheel
9 swing arm
11 start determininator
12 elapsed timer
13 start controller
15 throttle valve
16 start control request switch
17 crank rotation pulse generator
18 throttle sensor
19 gear position sensor
21 igniter
22 injector
23 indicator lamp
25 crank shaft
26 transmission
27 ignition timing correction map
28a, 28b map for low output
29a, 29b map for high output

What is claimed is:

1. An engine controller for providing improved vehicle acceleration and/or suppressing vehicle rear wheel slippage for a vehicle, the controller comprising:
    an elapsed timer for measuring elapsed time since a start of movement of the vehicle; and
    a start controller for adjusting an engine output of the vehicle by changing engine output in multiple stages until the elapsed time measured by the elapsed timer reaches a pre-determined control time, wherein the start controller adjusts the engine output of the vehicle in response to the start of the vehicle movement,
    wherein the multiple stages include a plurality of modes differing in at least one of an amount of engine output and a duration in each of the multiple stages with the different engine outputs,
    wherein the plurality of modes are set by combining engine output in the multiple stages and their control time,
    wherein each mode of the plurality of modes includes an adjustment that sequentially combines an increase or decrease in an amount of engine output and a control time,
    wherein the plurality of modes includes a first mode for temporarily increasing the engine output immediately after the start of the vehicle movement, and a second mode for temporarily decreasing the engine output immediately after the start of the vehicle movement,
    wherein determination of whether the vehicle has started to move is performed in response to operation of a start control request switch, provided that the vehicle has no failure confirmed matter, a gear position selected by a vehicle rider in the vehicle transmission connected to the vehicle engine is at a stage lower than a pre-determined position, and an engine rotation speed is within a pre-determined rotation speed range,
    wherein the start controller for adjusting the engine output of the vehicle holds start of the engine output adjustment until the conditions from the determination of whether the vehicle has started to move are satisfied and a pre-determined first input duration has elapsed in that state,
    wherein, in response to elapsing of the pre-determined first input duration since the start control request switch was operated, the start controller for adjusting the engine output of the vehicle applies the first mode,
    wherein, after that application of the first mode, in response to continued operation of the start control request switch and elapsing of a pre-determined second input duration, the engine start controller for adjusting the engine output of the vehicle applies the second mode, and
    wherein the operation of the start control request switch and a result of the determination whether the vehicle has started to move alters operation of the start controller for adjusting the engine output of the vehicle provided that the gear position selected by the vehicle rider in the vehicle transmission connected to the vehicle engine is at the stage lower than the pre-determined position, and the engine rotation speed is within the pre-determined rotation speed range.

2. The engine controller of claim 1, wherein the change in the multiple stages of the engine output includes at least a decrease in engine output.

3. The engine controller of claim 1, wherein the change of the engine output in multiple stages includes a plurality of adjustment types differing in at least either one of size of outputs of the engine and duration in each stage with the different engine outputs.

4. The engine controller of claim 1, wherein, in response to a transmission gear position connected to the engine changing to a pre-determined position or higher, the start controller ceases engine control to adjust the engine output prior to the elapsed time measured by the elapsed timer reaching the pre-determined control time.

5. The engine controller of claim 1, wherein, in response to an engine throttle opening degree becoming fully closed, the start controller ceases adjustment of the engine prior to the elapsed time measured by the elapsed timer reaching the pre-determined control time.

6. The engine controller of claim 1, further comprising a state of engine output adjustment control configured to adjust the engine output and a status of an engine rotation speed which satisfies an execution condition of the engine output adjustment control by lighting-on or a flashing pattern of an indicator lamp.

7. The engine controller of claim 1, wherein the engine receives a signal from a start control request switch, a crank pulse generator, a throttle sensor, and a gear position sensor and transmits an output signal to an igniter, an injector, and an indicator lamp.

8. The engine controller of claim 1, wherein the start control request switch mounted on a handle bar close to a grip of a handle bar of the vehicle.

9. The engine controller of claim 1, further comprising a start determinator configured to determine whether or not the vehicle has started to move based on rotation speed of the engine.

10. The engine controller of claim 9, wherein the start determinator determines that the vehicle has started to move in response to a drop rate of the engine rotation speed being larger than a pre-determined drop rate.

11. The engine controller of claim 9, wherein the start determinator suppresses the determination of whether the vehicle has started to move in response to the rotation speed of the vehicle engine being at or higher than pre-determined upper limit rotation speed.

12. The engine controller of claim 9, wherein, in response to a throttle opening degree of the vehicle engine being smaller than a pre-determined throttle lower limit opening degree a corresponding engine rotation speed, the start determinator suppresses start determination of the vehicle.

13. The engine controller of claim 9, further comprising a start control request switch connected to the start controller and receiving an operation input on whether or not to execute control for adjustment by changing an output of the engine in multiple stages.

14. The engine controller of claim 13, wherein the start control request switch selects whether or not to execute an engine output adjustment control at the start of the vehicle and selects what mode of the engine output adjustment control is to be executed.

15. The engine control of claim 14, wherein the engine controller comprises a plurality of ignition timing correction maps determined by a relation between engine rotation and throttle opening degree and a standard ignition timing map determined by a relation between the engine rotation speed and throttle opening degree, wherein each of the ignition timing correction maps determines a correction amount in relation to the engine rotation speed and the throttle opening degree from the standard ignition timing of the engine in accordance with a mode selected by an operation of the start control request switch.

* * * * *